March 18, 1969  H. C. SWIFT  3,433,328
DISK BRAKE ASSEMBLY AND PIVOTAL SUPPORT MEANS THEREFOR
Filed Oct. 13, 1966  Sheet 1 of 3

INVENTOR.
Harvey C. Swift
BY
Harness, Dickey & Pierce
ATTORNEYS.

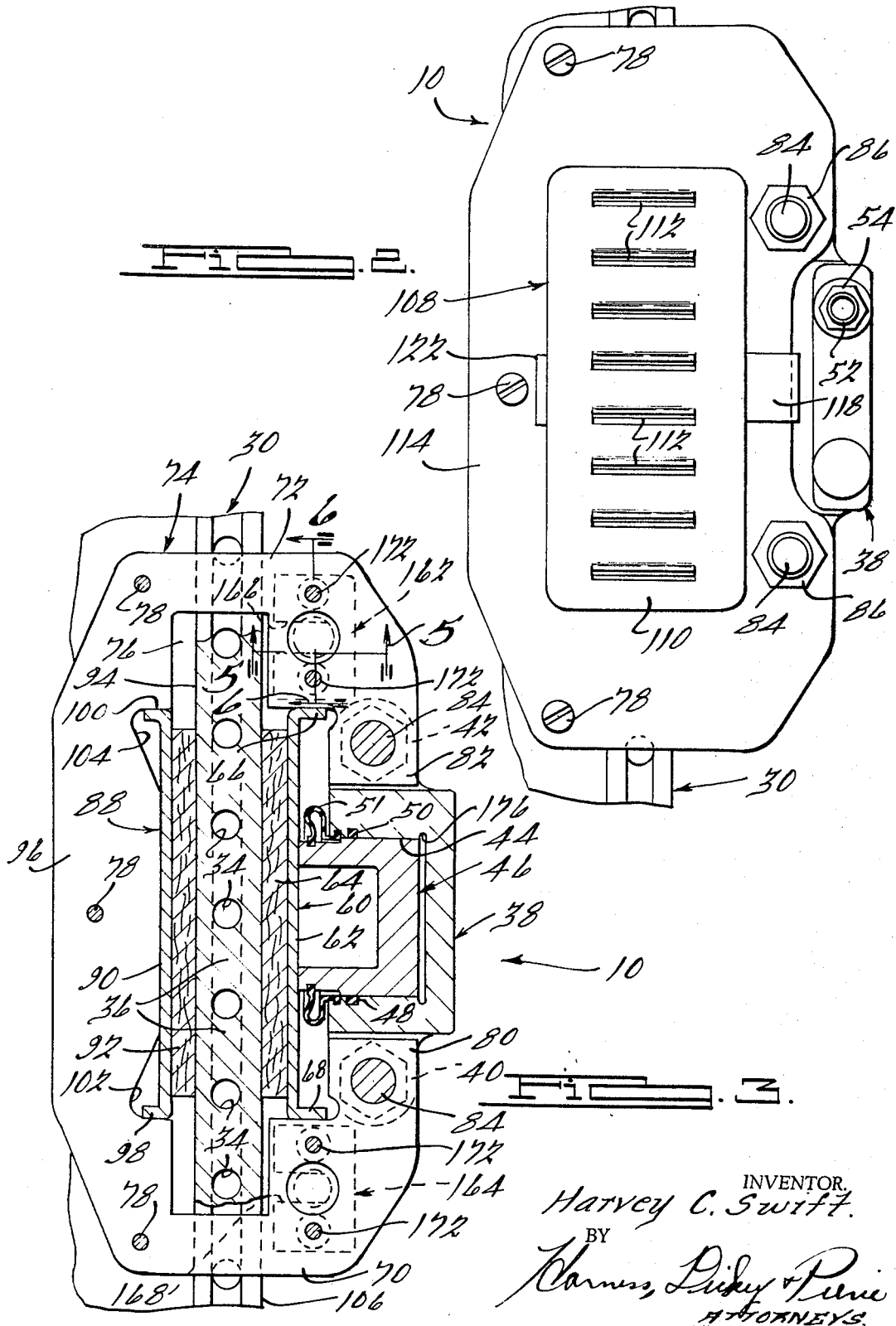

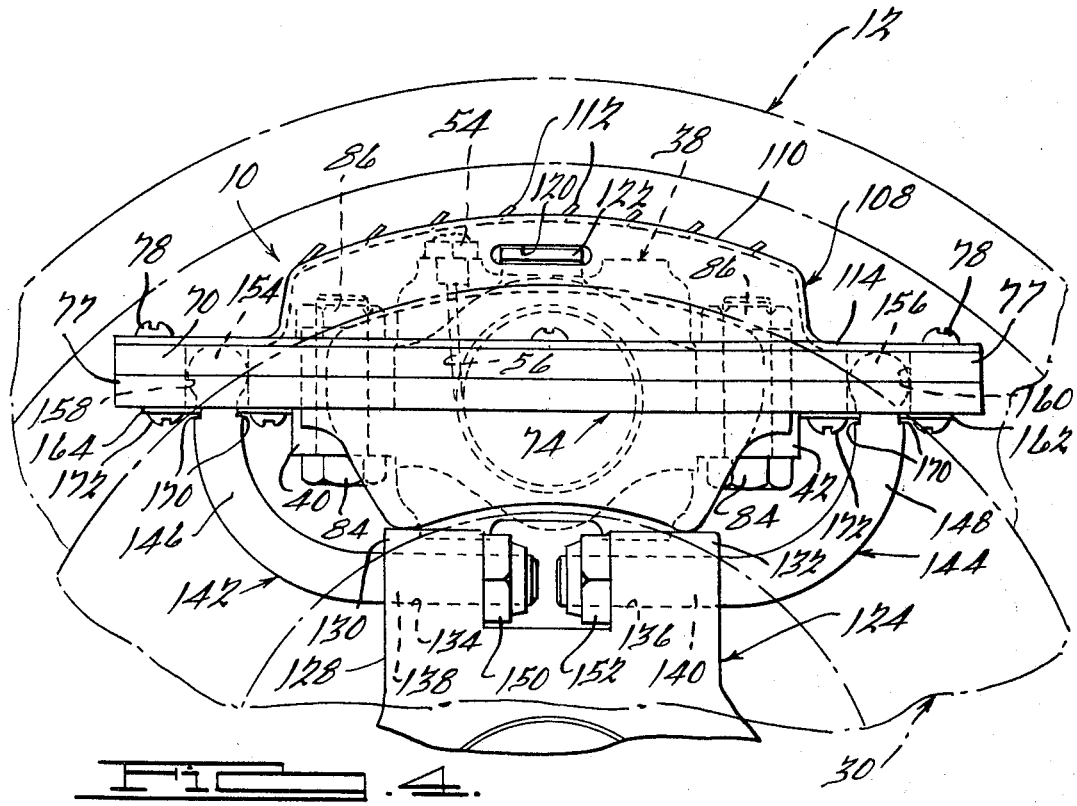
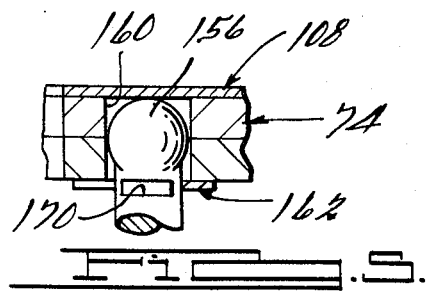
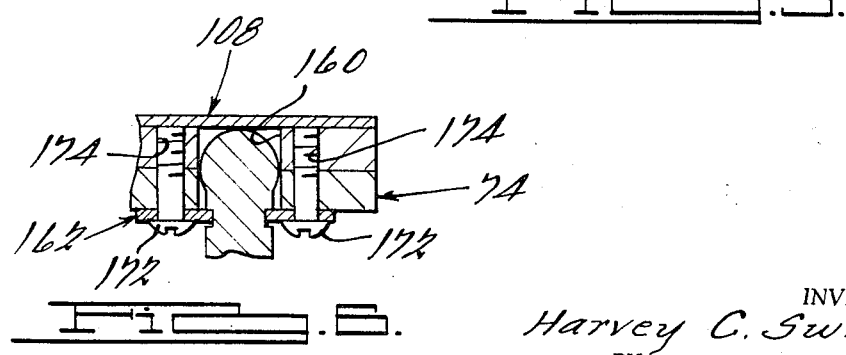

United States Patent Office 3,433,328
Patented Mar. 18, 1969

3,433,328
DISK BRAKE ASSEMBLY AND PIVOTAL
SUPPORT MEANS THEREFOR
Harvey C. Swift, Birmingham, Mich., assignor to Kelsey-Hayes Company, Romulus, Mich., a corporation of Delaware
Filed Oct. 13, 1966, Ser. No. 586,562
U.S. Cl. 188—73          5 Claims
Int. Cl. F16d 55/00, 65/10

ABSTRACT OF THE DISCLOSURE

A disk brake assembly embodying a light-weight fabricated caliper assembly comprised of a housing and a yoke member that is fixed to the housing. A supporting structure is also provided for supporting the caliper assembly for sliding movement in a direction parallel to the axis of rotation of the associated brake disk and for absorbing braking torque.

---

This invention relates generally to braking devices for automotive vehicles and, more particularly, to a new and improved disk brake construction.

Generally speaking, the disk brake construction of the present invention is characterized by the provision of a pair of mounting arms which are adapted to be secured to the brake housing or caliper in a manner such that the housing, together with a generally C-shaped yoke member which extends between the housing and one of a pair of brake shoes, is prevented from rotating about the axis of the brake rotor in response to the torque reaction force developed upon engagement of the brake shoes with the rotor. The mounting arms are connected to the housing in a manner such that the housing and the yoke member may move longitudinally of the axis of rotation of the brake rotor so that the pair of brake shoes are continuously disposed in spaced parallel relationship with respect to the rotor. With this construction, the mounting arms are adapted to absorb the reaction torque developed by the brake, yet permit the brake shoes to engage the brake rotor as they are disposed in coplanar relation therewith, whereby to promote more even wear on the brake linings.

It is accordingly a general object of the present invention to provide a new and improved disk brake construction.

It is a more particular object of the present invention to provide a new and improved disk brake construction of the above character having improved torque reaction characteristics.

It is still a more particular object of the present invention to provide a disk brake construction of the above type with improved means for permitting the brake caliper or housing and brake shoes to move at right angles to the plane of the brake rotor, whereby to assure that the brake shoe linings are continuously disposed in substantially spaced parallel relationship with respect to the opposite sides of said rotor.

It is another object of the present invention to provide a disk brake construction of the above character wherein the brake caliper or housing is prevented from rotating in response to the reaction torque developed upon engagement of the brake shoes with the associated brake rotor, yet is movable longitudinally of the rotational axis of the rotor to assure proper positioning of the brake shoes.

It is another object of the present invention to provide a new and improved disk brake construction which is adapted to apply substantially equal pressure to each of a pair of brake shoes.

It is a further object of the present invention to provide a new and improved disk brake construction which is of a relatively simple design, is easy to assemble, economical to commercially manufacture, rugged in construction and reliable and efficient in operation.

Other objects and advantages of the present invention will become apparent from the following detailed description, taken in conjunction with the accompanying drawings, wherein:

FIGURE 2 is an enlarged fragmentary cross-sectional view of a portion of the disk brake construction illustrated in FIGURE 1, as taken substantially along the line 2—2 thereof;

FIGURE 3 is an enlarged fragmentary cross-sectional view of a portion of a disk brake construction illustrated in FIGURE 1, as taken substantially along the line 3—3 thereof;

FIGURE 4 is a fragmentary cross-sectional view of a portion of a disk brake construction illustrated in FIGURE 1, as taken substantially along the line 4—4 thereof;

FIGURE 5 is a fragmentary cross-sectional view taken along the line 5—5 of FIGURE 3, and FIGURE 6 is a fragmentary cross-sectional view taken along the line 6—6 of FIGURE 3.

Figure 1:
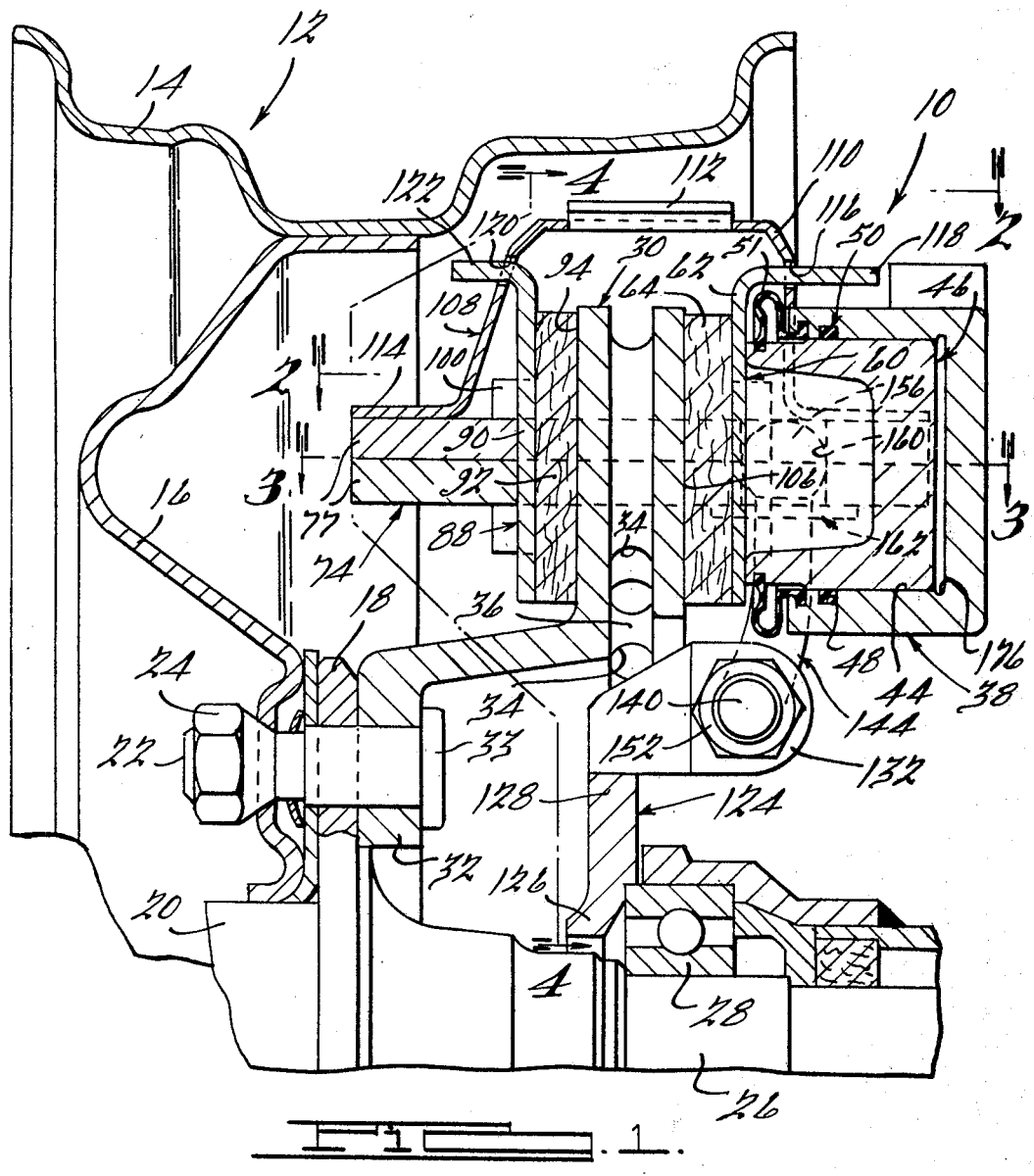
FIGURE 1 is a cross-sectional view of a portion of a disk brake construction in accordance with an exemplary embodiment of the present invention, as shown in operative association with a portion of a vehicle wheel.

For convenience of description, the terms "axially outer," "axially inner" and words of similar import will have reference to the disk brake construction of the present invention shown in FIGURE 1, with the axially outer end of the brake being located at the left side of this figure. Likewise, the terms "radially inner," "radially outer" and derivatives thereof will have reference to the geometric center of the brake construction of the present invention and the various component parts thereof.

Referring now to the drawings and in particular to FIGURE 1, a disk brake construction 10, in accordance with an exemplary embodiment of the present invention, is shown in operative association with a section of a vehicle wheel 12 having a rim portion 14 and a web portion 16 which is secured to a mounting flange 18 of a wheel hub 20 by means of suitable screws, bolts or the like 22 and nuts 24. The wheel hub 20 is rotatably supported on a fixed wheel spindle or axle 26 by means of suitable bearing means 28 in the usual manner. A conventional brake disk or rotor 30 is mounted for rotation about the axis of the wheel axle 26 by having a laterally offset flange section 32 thereof secured to the hub flange 18 by means of bolts 33. As best seen in FIGURE 1, the brake rotor 30 is formed with a plurality of radially extending openings or apertures 34 separated by circumferentially spaced web portions 36, which portions 36 act as air-conveying or fan means to supply cooling air through the openings 34 during rotation of the brake rotor 30.

The brake construction 10 comprises a generally cup-shaped housing or caliper, generally designated 38, which is formed with a pair of outwardly extending projections 40 and 42 (see FIGURE 4) adapted to be used in operatively mounting the housing 38 in a manner later to be described. The housing member 38 defines a cylindrical bore 44 which slidably or reciprocably carries a piston member 46, the bore 44 being formed with an annular recess 48 within which a suitable fluid seal 50 is disposed. A suitable resilient dust cover or boot 51 is provided around the outer end of the piston 46 to prevent any dust, road dirt or the like from entering the bore 44. As will be apparent, the piston 46 is adapted to move longitudinally of the housing 38, i.e., axially of the rotor 30, under the force of pressurized fluid being introduced into the bore 44 due to energization of an associated master cylinder (not shown), which forces conventional brake fluid or the like into the interior of the bore 44 through a suitable fluid conduit 52 (see FIGURE 2) that is communicable with the bore 44 by means of a fluid fitting 54 and a fluid passage 56 that extends between the fitting 54 and the interior of the bore 44, as seen in FIGURE 4.

A brake shoe 60 is disposed interjacent the axially outer side of the piston member 46 and the brake rotor 30 and includes a backing plate 62 and a brake lining 64 which is rigidly secured, as by bonding, riveting or the like, to the backing plate 62 in the usual manner. The backing plate 62 is formed with a pair of axially inwardly extending tab sections 66 and 68 (see FIGURE 3) which are adapted to be embraced between a pair of axially inwardly extending leg sections 70 and 72, respectively, of a generally C-shaped pressure yoke member 74 which defines a central throat 76 through which a sector of a brake rotor 30 rotates during rotation of the wheel 12. The yoke member 74 comprises a pair of identical plates 77 which are fixedly secured to each other by means of suitable screws, bolts or the like, generally designated 78. The axially inwardly extending ends of the sections 70 and 72 of the yoke member 74 are formed with inwardly extending portions 80 and 82, respectively, which are fixedly secured to the projections 40 and 42 of the housing member 38 by means of a pair of substantially vertically extending screws, bolts or the like 84 and nuts 86, as best seen in FIGURE 4, whereby the yoke member 74 and housing member 38 comprise a single unitized assembly.

Another brake shoe 88, which includes a backing plate 90 having a brake lining 92 bonded or riveted thereto, is disposed interjacent a radial braking surface 94 of the rotor 30 and a medial section 96 of the yoke member 74 which extends between the leg sections 70 and 72 thereof. The backing plate 90 is formed with a pair of axially outwardly extending tab sections 98 and 100 at the opposite ends thereof which are disposed within a pair of recessed portions 102 and 104, respectively, formed in the medial section 96 of the yoke member 74, whereby to prevent any relative movement between the brake shoe 88 and yoke member 74 in a direction perpendicular to the rotational axis of the rotor 30. It will be seen that as pressurized fluid is introduced into the bore 44, the piston 46 will move toward the rotor 30, thereby engaging the brake lining 64 with a radial face 106 thereof. Simultaneously, the housing member 38 will move axially away from the rotor 30, with the result that the yoke member 74 will move toward the right in FIGURES 1 and 3, thereby biasing the brake shoe 88 into frictional engagement with the rotor surface 94.

Mounted on the upper side of the brake construction 10 is a cover plate 108 having a raised portion 110 which extends over the top of the brake shoes 60 and 88. The upper side of the cover portion 110 is provided with a plurality of louvers 112 which permit the ingress of cooling air into the brake 10. Extending around the lower end of the cover portion 110 is a mounting portion 114 which is disposed in substantial coplanar relationship with the upper side of the yoke member 74 and is fixedly secured thereto by means of the screws, bolts or the like 78. It will be noted that the bolts 84 extend upwardly through the cover portion 114 to further secure the cover member 108 onto the top of the yoke member 74. The axially inner side of the cover portion 110 is formed with an elongated opening 116 which is adapted to receive an axially inwardly extending flange section 118 formed on the upper edge of the backing plate 62. As best seen in FIGURE 1, the opening 116 is slightly larger than the flange 118 so that the latter may move freely relative to the cover member 108 upon actuation of the brake 10. Another generally oval-shaped opening 120 is formed on the axially outer side of the cover portion 110 and is adapted to receive an axially outwardly extending flange portion 122 formed on the backing plate 90. The opening 120 is also slightly larger than the flange portion 122 to permit free axial movement of the brake shoe 88 relative to the cover member 108.

An adaptor mounting plate, generally designated 124, is fixedly mounted relative to the vehicle wheel 12 by having an axially inner portion 126 thereof, which extends around the wheel spindle 26, rigidly secured to a flange portion (not shown) of the wheel spindle 26 by means of suitable screws, bolts and the like (not shown). The adaptor plate 124 comprises an upwardly extending section 128 comprising a pair of axially inwardly extending portions 130 and 132 which are formed with aligned bores 134 and 136, respectively. The bores 134, 136 are adapted to receive substantially horizontally extending leg portions 138 and 140 of a pair of generally L-shaped support arms 142 and 144. The arms 142, 144 also comprise substantially vertically upwardly extending leg sections 146 and 148 which are preferably integrally formed with the sections 138 and 140 and function in a manner later to be described. The ends of the leg sections 138, 140 are externally threaded and adapted to have suitable retaining nuts 150 and 152 received thereon for securing the arms 142 and 144 against any movement relative to the adaptor plate 124 in a direction perpendicular to the axis of rotation of the rotor 30. It will be noted, however, that the arms 142, 144 are adapted to pivot slightly about an axis extending through the bores 134 and 136, as will be described.

The upper ends of the leg sections 146 and 148 are formed with substantially spherical head portions 154 and 156, respectively, which are adapted to be received within a pair of bores 158 and 160 formed in the yoke portions 80 and 82, respectively. It will be noted that the diameter of the head portions 154, 156 are substantially equal to the thickness of the yoke member 74, and that the size of the bores 158, 160 are selected such that the inner peripheries of the bores 158, 160 movably engage the head portions 154, 156. As best seen in FIGURE 4, the cover portion 114 extends across the upper ends of the bores 158 and 160 to limit downward movement of the yoke member 74 relative to the head portions 154 and 156. The head portions 154, 156 of the support arms 142, 144 are secured within the bores 158 and 160 by means of a pair of generally C-shaped retaining plates 162, 164 (see FIGURE 3) which define recessed throats 166 and 168, respectfully. The portions of the support arms 142 and 144 directly below the head portions 154 and 156 are formed with opposed notches or recesses 170 which are adapted to receive the throats 166 and 168 of the retaining plates 162 and 164. As best seen in FIGURES 4 and 6, the plates 162 and 164 are fixedly secured to the lower side of the yoke member 74 by means of suitable screws, bolts or the like 172 which are threadably mounted within bores 174 formed in the yoke member 74 adjacent the bores 158 and 160.

In operation, upon energization of the aforementioned master cylinder, brake fluid is admitted into the bore 44 through the conduit 52, fitting 54 and fluid passage 56, resulting in the piston member 46 being biased toward the left in FIGURES 1 and 3, thereby engaging the brake lining 64 with the rotor face 106. Simultaneously, the housing 38 will be biased toward the right in FIGURES 1 and 3, with the result that the brake lining 92 is biased into engagement with the rotor face 94. As will be apparent, as the brake linings 64 and 92 compressingly and frictionally engage the rotor 30, rotation of the vehicle wheel 12 will slow down or stop. Upon relieving the fluid pressure within the bore 44, the biasing force on the piston 46 and housing 38 will be relieved and the rotor 30 will be released.

As the brake linings 64 and 92 are forced into engagement with the rotor 30, a considerable amount of torque is developed which tends to bias the two brake shoes 60 and 88 in the direction in which the rotor 30 is turning. This reaction torque on the brake shoes 60, 88 is adapted to be absorbed directly by the pressure yoke member 74 due to the fact that the backing plates 62 and 90 have their respective tab sections 66, 68 and 98, 100 juxtapositioned directly against the leg sections 70 and 72 of the yoke member 74. The reaction torque thus applied to the yoke 74 is in turn transmitted to the support arms 142 and 144 which are secured at their lower ends to the fixedly mounted adaptor plate 124. By virtue of the fact that the yoke member 74 is prevented from moving in a direction perpendicular to the rotational axis of the rotor 30, the piston 46 is free from any torque reaction, and its movement within the bore 44 remains unimpeded at all times.

During normal operation of the vehicle wheel 12, the brake rotor 30 may have a tendency to rotate slightly out of its normal rotational plane arranged at a right angle to its rotational axis. When this occurs the housing 38 and yoke member 74 may pivot slightly about the head sections 154 and 156 of the arms 142 and 144, and also, the arms 142, 144 may pivot slightly about an axis through the bores 134 and 136. With this construction, the brake linings 64 and 92 will constantly be disposed in spaced parallel relationship with respect to the rotor surfaces 106 and 94 so that uniform pressure is applied by the brake shoes 60 and 88 to both sides of the rotor 30. This, of course, is very desirable since it promotes more even wear on the brake linings 64 and 92, which, of course, extends the operational life thereof and enhances the economies of operation of the brake 10.

It may be noted that a somewhat greater force is required to apply the brake shoe 88 than is needed to apply the shoe 60, due to the fact that the housing 38 and yoke member 74 are of a somewhat greater mass than the piston 46. Fluid pressure within the bore 44 acts on the piston 46 over an area equal to its cross section; however, the same fluid pressure acts on the housing 38 over an area somewhat greater than the area of the piston due to an outwardly extending recess 176 formed around the end of the bore 44. The differential between the force acting on the housing 38 and piston 46 is proportional to the cross sectional area of the recess 176 so that by careful dimensional selection, this difference in energizing forces can be substantially reduced or eliminated, thereby further promoting more even wear of the brake linings 64 and 92.

While it will be apparent that the exemplary embodiment illustrated herein is well calculated to fulfill the objects above stated, it will be appreciated that disk brake 10 of the present invention is susceptible to modification, variation and change.

What is claimed is:

1. A disk brake assembly for braking the rotation of an associated disk, said brake assembly comprising a fabricated caliper assembly comprising housing means defining a cylinder bore and adapted to be positioned upon one side of the disk, a piston supported for reciprocation within said cylinder bore, means for hydraulically pressurizing said cylinder bore for moving said piston relative to said cylinder bore, a generally planar yoke member said yoke member having a medial section adapted to be disposed on the other side of the disk, end portions at opposite ends of said medial portion extending across the disk and toward said housing and inwardly extending portions formed at the outer termination of said end portions, said inwardly extending portions extending from said end portions toward said housing, said yoke member defining a central throat adapted to receive a portion of the disk, means for affixing said inwardly extending portions of said yoke member to said housing, a first brake shoe juxtaposed to said piston and interposed between said piston and the one side of the disk for engagement with the disk upon movement of said piston, a second brake shoe disposed between said medial section of said yoke and the other side of the disk, said fabricated caliper assembly being adapted to be supported for movement in a direction parallel to the axis of rotation of the disk upon the application of fluid pressure to said cylinder bore for bringing said second brake shoe into frictional engagement with the other side of the disk, and means for supporting said caliper assembly for such movement relative to a reaction member fixed relative to the disk comprising a pair of spaced support arms journaled upon said reaction member for pivotal movement about respective axes disposed substantially perpendicularly to the axis of rotation of the disk, said support arms extending in a substantially perpendicular direction with respect to their respective pivot axes and toward said yoke member, ball means formed at the outer end of each of said support arms, and spaced cylindrical socket openings formed in said yoke member, the axis of said socket openings being disposed substantially perpendicular to the respective pivot axis of said support arms, said ball means being received in a respective one of said socket openings for supporting said fabricated caliper assembly for movement in a direction substantially parallel to the axis of rotation of said disk and for precluding rotation of said fabricated caliper assembly about the axis of rotation of said disk.

2. A disk brake assembly as set forth in claim 1 wherein the yoke member is comprised of a plate, the housing means having outwardly extending projections at each side of the cylinder bore, the inwardly extending portions of said yoke member being directly affixed to said housing means projections.

3. A disk brake assembly as set forth in claim 2 wherein the yoke member is comprised of two plates fixed to each other and defining a laminated construction.

4. A disk brake assembly as set forth in claim 1 wherein each of the brake shoes includes a backing plate, the backing plate of the first brake shoe being abuttingly engaged with shoulders formed on the inwardly extending portions of the yoke member for transmitting frictional torque forces from said first brake shoe to said yoke member, the backing plate of the second brake shoe being abuttingly engaged with shoulders formed on the medial section of said yoke member for transmitting frictional torque forces from said second brake shoe to said yoke member.

5. A disk brake assembly as set forth in claim 4 further including a sheet metal cover plate affixed to the yoke member extending substantially across its central throat, each of the backing plates of the respective brake shoes having an outstanding flange portion extending substantially perpendicularly to and away from the disk, a pair of space openings formed in said cover plate for receiving the respective said flange portions of said backing plates for assisting in locating said brake shoes relative to the disk.

References Cited

UNITED STATES PATENTS

| 2,915,147 | 12/1959 | Davis | 188—73 |
| 3,210,103 | 10/1965 | Montgomery et al. | 287—21 |
| 3,268,034 | 8/1966 | Burnett | 188—73 |
| 3,298,469 | 1/1967 | Robinette | 188—73 |
| 3,055,457 | 9/1962 | Lyon. | |
| 3,365,030 | 1/1968 | Cochrane. | |

FOREIGN PATENTS 1,189,334   3/1965   Germany.

GEORGE E. A. HALVOSA, Primary Examiner.

U.S. Cl. X.R.

188—218